United States Patent [19]
Atoche-Juarez et al.

[11] Patent Number: 5,918,952
[45] Date of Patent: Jul. 6, 1999

[54] WHEEL SLIPPAGE CONTROL SYSTEM

[75] Inventors: Carlos Atoche-Juarez, West Bloomfield, Mich.; Peter Dominke, Bietigheim-Metterzimmern, Germany; Werner Weber, Nussloch, Germany; Edgar Bernardi, Dormagen, Germany

[73] Assignee: Robert Bosch GmbH, Stuttgart, Germany

[21] Appl. No.: 07/827,680

[22] Filed: Jan. 29, 1992

[30] Foreign Application Priority Data

Feb. 2, 1991 [DE] Germany ............................ 41 03 138

[51] Int. Cl.⁶ ................................................. B60T 8/32
[52] U.S. Cl. ............................................................ 303/156
[58] Field of Search .............................. 303/92, 93, 100, 303/110, 20, 105, 107, 108, 95, 156

[56] References Cited

U.S. PATENT DOCUMENTS 4,233,599 11/1980 Brearly ........................................ 303/92
5,032,821 7/1991 Domanico ................................ 303/108

FOREIGN PATENT DOCUMENTS 1603956 12/1981 United Kingdom .

*Primary Examiner*—Matthew C. Graham
*Attorney, Agent, or Firm*—Felfe & Lynch

[57] ABSTRACT

A processing circuit has a computing cycle divided into several subcycles of uniform duration. The time base values of the last three nulls of a square wave signal produced from the sinusoidal signal of a wheel speed sensor are stored in a register with three places. At the beginning of a subcycle the difference D of the latest and of the oldest time base values stored in the register is formed and in some cases after limiting is converted to a value 1/D and stored, while the previously stored oldest value is erased. At the start of a new computing cycle the stored value 1/D is further processed as the new wheel speed.

6 Claims, 2 Drawing Sheets

WHEEL SLIPPAGE CONTROL SYSTEM

BACKGROUND OF THE INVENTION

In wheel slippage systems (ABS or ASR) it is known to count during a computing cycle the nulls of the output voltage of the sensors measuring wheel speed and from this count and the time elapsed since the first null to compute the speed of the wheel. The number of nulls to be counted has been limited to a maximum (e.g., 16 in a computing cycle of 10 msec), in order to minimize the load on the microprocessor by program interrupts and thus keep the computing cycle down to 10 ms. The (last) computed speed is then limited, in some cases, (e.g., to 50 g change in both directions) and stored, and used in the next computing cycle as the speed value to obtain the actuating signals for brake pressure control by means of a preset algorithm. At high rotatory wheel speeds a speed value that is relatively remote in time from the new computing cycle is used for the control.

It is also known (DE-C2 2801520 FIG. 2) to count the successive half-waves of the sensor signal separated by pulses of higher frequency, store the partial measured value first obtained and, after the second partial measured value is obtained, to determine by totalization the period length that is used for the control.

SUMMARY OF THE INVENTION

The new method of obtaining the wheel speed has the advantage that the most current speed value is actually used for the control. The speed is updated almost continually. Thus the error is reduced. The method assumes a very fast computer (e.g., INTEL 8 Ø C196 KR). In this computer if the speed-proportional frequency is fed to the event processor inputs, each flank of the square-wave signal leads through the peripheral transaction server unit to the direct storage of a time base value. A storage cell drum containing a maximum of three time base values present in the computer is updated with each new time base value, i.e., this value is stored anew and the oldest of the stored values is erased.

DETAILED DESCRIPTION OF THE PREFERRED EMBODIMENT

Figure 1:
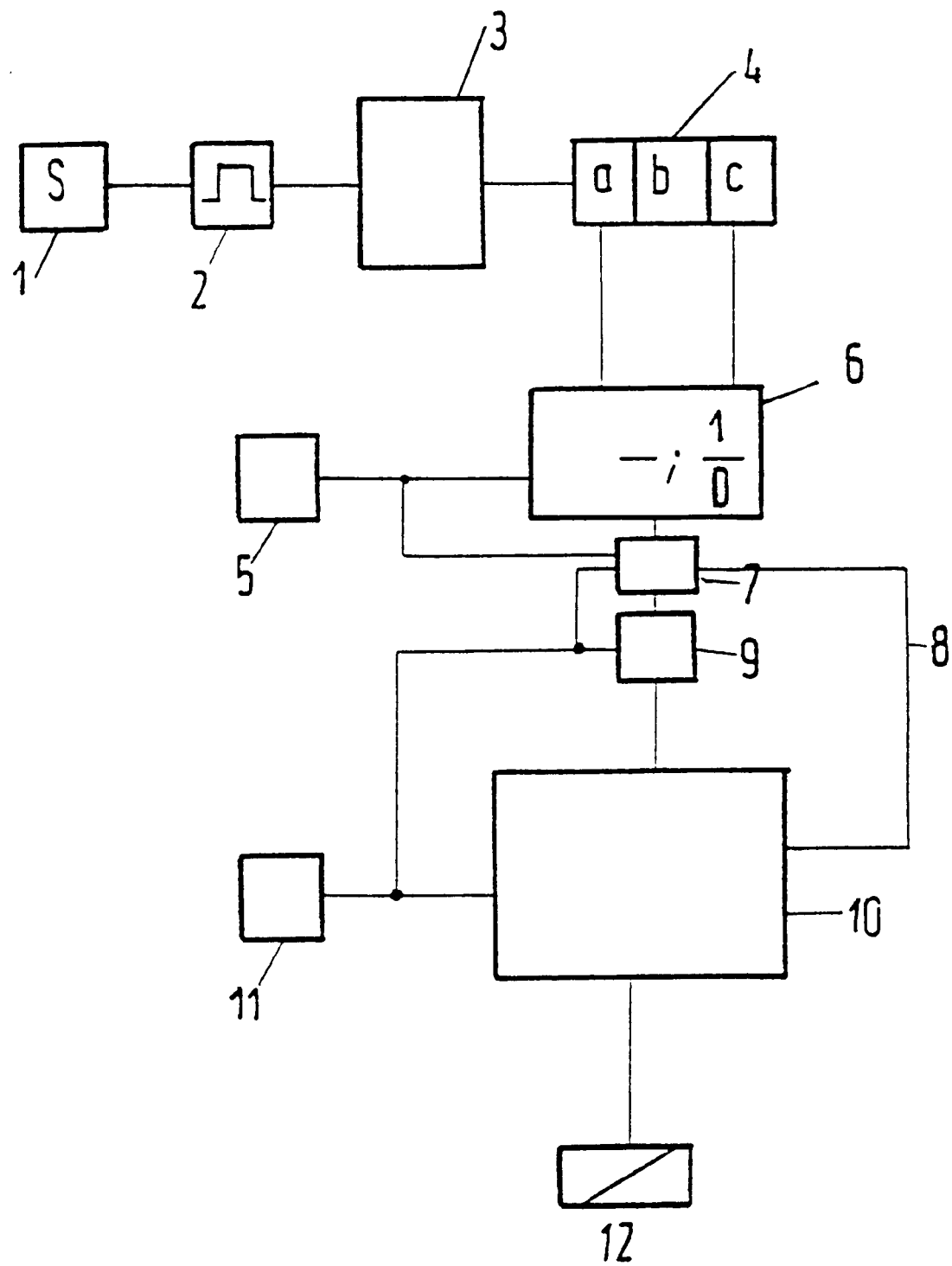
FIG. 1 is a block diagram of the apparatus.

FIG. 1, a sensor 1 detects the rotatory speed of a vehicle wheel, and a circuit 2 produces a square wave signal from the sinusoidal signal of the sensor. At each null of the square wave signal a block 3 is caused to issue a time-base signal (a signal identifying the moment in time). This signal is fed to a first register 4 comparable to a shift register; this erases the oldest value (at 4c), the values stored in b and a are shifted one position to the right, and the new value is stored in a.

At the start of the next sub-cycle a clock 5 gives a signal, whereby the processor 6 forms the difference D between the values stored in 4a and 4c and at the same time forms 1/D. The result, $V_R=1/D$ is limited in a limiter 7 to a given maximum speed change (e.g., 50 g). The maximum speed change can be made variable; thus, for example, at the start of a control cycle the limiter would begin at a low value e.g., 10 g, and then increase this value in stages in the individual subcycles until the 50 g upper limit is reached. A line 8 is intended to indicate this possibility. Each time, the speed value last obtained is stored in a second register 9. The computing cycle RZ of a processor 10 is determined by a clock 11. At the start of a computing cycle the wheel speed last detected and stored in register 9 is fed to the processor 10 which in accordance with a preset algorithm produces therefrom brake pressure control signals by which, for example, a 3/3 magnetic valve 12 is actuated.

Figure 2:
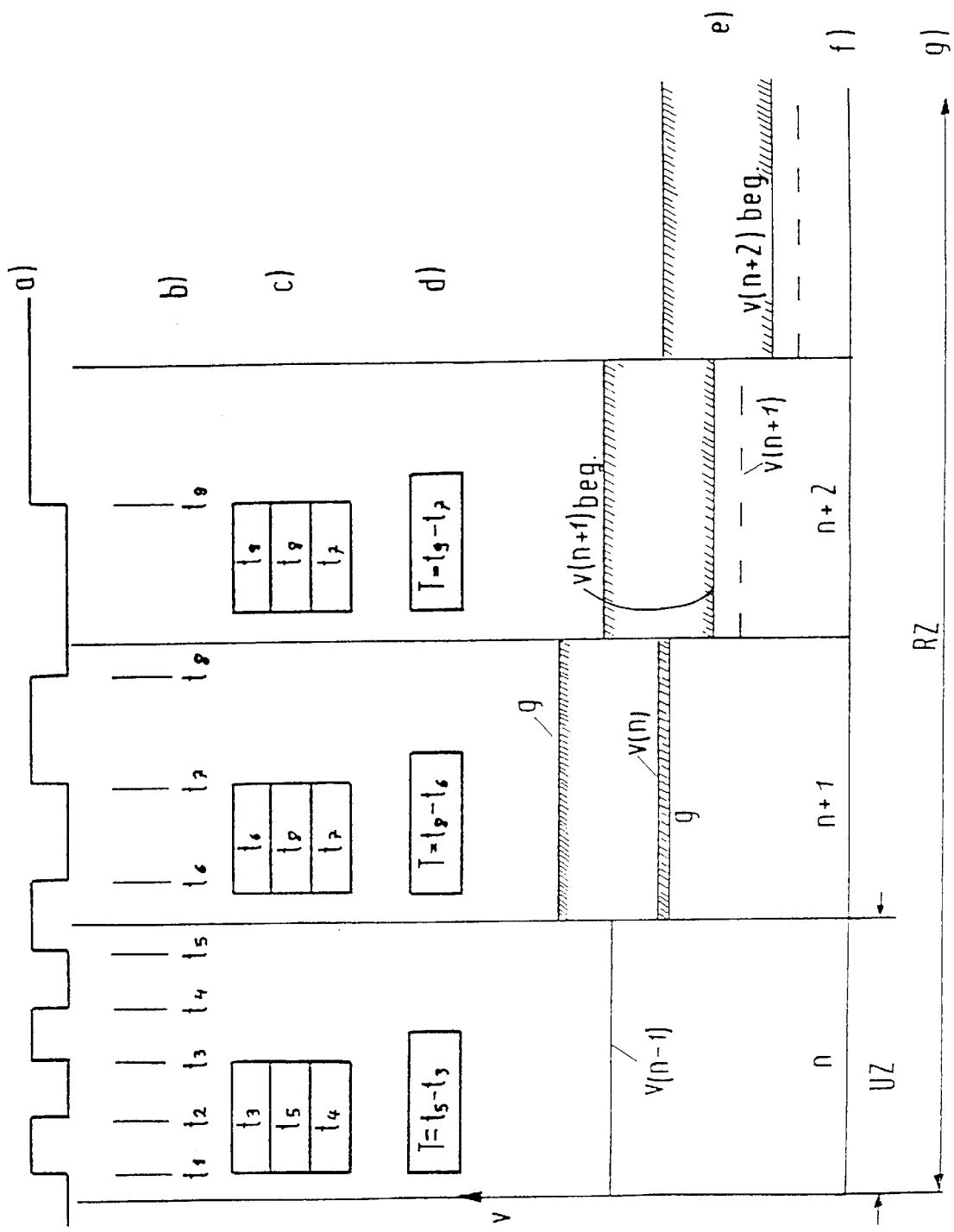
FIG. 2 is a diagram which explains the principle.

FIG. 2 shows in line a) the square-wave signal obtained from the sensor signal. In line b) the time base values are recorded at the individual nulls. It can be seen from lines f) and g) that the computing cycle RZ is divided into several subcycles UZ. At the beginning of subcycle (n+1) the difference $T=t_5-t_3$ (line d) is formed in the processor 6. In register 4 the values $t_3$ to $t_5$ are stored at this moment. This difference T corresponds to the speed $V_{(n)}$ entered in line e) in the cycle (n+1), which did not have to be limited (limit g) because the change with respect to $V_{(n-1)}$ was not too great. Accordingly, at the beginning of the subcycle (n+2) the difference $T=(t_8-t_6)$ is formed. The corresponding speed $V_{(n+1)}$ would be as indicated by the broken line. On account of the limitation, however, the speed value would be placed at the limit ($V_{(n+1)}$beg). At the beginning of another computing cycle RZ, the speed value last obtained is evaluated each time as the wheel speed.

We claim:

1. Wheel slippage control system comprising
   wheel speed sensor means for producing a wheel speed signal during preset computing cycles, each computing cycle being divided into subcycles of uniform duration, said wheel speed signal having null times,
   means assigning a time base value to each null time,
   a first register in which the last three time base values including a third last, second last, and last time base value are stored,
   means for determining a speed value from the third last time base value and the last time base value at the beginning of each subcycle,
   a second register in which the speed value is stored,
   means for producing brake pressure control signals during a computing cycle using the last speed value stored in the previous computing cycle, and
   means for controlling brake pressure using said brake pressure control signals.

2. Wheel slippage control system as in claim 1 further comprising means for limiting the wheel speed at the beginning of each subcycle.

3. Wheel slippage control system as in claim 2 wherein said means for limiting the wheel speed limits the wheel speed to values which increase incrementally from subcycle to subcycle up to a maximum value.

4. Method for controlling wheel slippage, comprising
   producing a wheel speed signal having null times during preset computing cycles, each computing cycle being divided into subcycles of uniform duration,
   assigning a time base value to each null time,
   storing the last three time base values including a third last, second last, and last time base value in a first register,
   determining a speed value from the third last time base value and the last time base value at the beginning of each subcycle,
   storing the speed value in a second register,
   producing brake pressure control signals during a computing cycle using the last speed value stored in the previous computing cycle, and
   controlling brake pressure using said brake pressure control signals.

5. Method as in claim 4 further comprising limiting the wheel speed at the beginning of each subcycle.

6. Method as in claim 5 wherein said wheel speed is limited to values which increase incrementally from subcycle to subcycle up to a maximum value.

* * * * *